United States Patent
Chen et al.

(10) Patent No.: US 11,141,993 B2
(45) Date of Patent: Oct. 12, 2021

(54) REVOLVING DRUM TYPE DIGITAL LENS PRINTING DEVICE

(71) Applicant: TOPLENS HANGZHOU INC., Zhejiang (CN)

(72) Inventors: Donghui Chen, Hangzhou (CN); Hongxiang Meng, Hangzhou (CN)

(73) Assignee: TOPLENS HANGZHOU INC., Hangzhou (CN)

( * ) Notice: Subject to any disclaimer, the term of this patent is extended or adjusted under 35 U.S.C. 154(b) by 134 days.

(21) Appl. No.: 16/625,706

(22) PCT Filed: Jun. 21, 2018

(86) PCT No.: PCT/CN2018/092112
§ 371 (c)(1),
(2) Date: Dec. 21, 2019

(87) PCT Pub. No.: WO2018/233653
PCT Pub. Date: Dec. 27, 2018

(65) Prior Publication Data
US 2021/0146699 A1    May 20, 2021

(30) Foreign Application Priority Data

Jun. 22, 2017 (CN) .......................... 201710482470.X

(51) Int. Cl.
*B41J 3/407* (2006.01)

(52) U.S. Cl.
CPC ..................................... *B41J 3/407* (2013.01)

(58) Field of Classification Search
CPC ...... B41J 3/407; B41J 3/4073; B41J 3/40731; B41J 3/40733
See application file for complete search history.

(56) References Cited

U.S. PATENT DOCUMENTS

| | | | |
|---|---|---|---|
| 2012/0017783 A1* | 1/2012 | Uptergrove | B41F 17/18 101/38.1 |
| 2016/0236483 A1* | 8/2016 | Till | B41J 3/4073 |
| 2017/0299886 A1* | 10/2017 | Carmon | G02C 7/021 |
| 2018/0164719 A1* | 6/2018 | Stowitts | B41M 5/0047 |
| 2019/0163097 A1* | 5/2019 | Landa | B41J 2/01 |

* cited by examiner

*Primary Examiner* — Scott A Richmond
(74) *Attorney, Agent, or Firm* — Guosheng Wang; United States Research and Patent Firm

(57) ABSTRACT

The invention provides a good inking quality and high inking efficiency lens digital inking device in drum layout. It includes a rotating unit, a lens height adjustment unit, invisible mark recognition unit and print head, utilizing the rotating circumference of the same drum, to completely or partially compensating for the curvature of the front surface of the lens, making the distance between print head to the center or edge of the lens edge reduced, which improves the print quality. This invention is suitable for all kinds of lens inking.

20 Claims, 4 Drawing Sheets

REVOLVING DRUM TYPE DIGITAL LENS PRINTING DEVICE

CROSS-REFERENCE TO RELATED APPLICATIONS

This application is a continuation (CIP) of, and claims priority to, international Application No. PCT/CN2018/092112, filed on Jun. 21, 2018, which claims the benefit of Chinese Patent Application App. No. 201710482470.X, filed on Jun. 22, 2017. The entire contents of the foregoing are incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The invention relates to a lens digital inking device. More specifically, the present invention relates to a drum-type lens digital inking device.

BACKGROUND OF THE INVENTION

RX lenses, especially progressive multifocal lenses, require invisible laser reference marks on the lens. For easy fitting, it is necessary to print the erasable ink visible mark on the lens according to the position of the invisible mark. Such visual ink mark is often achieved by pad inking, screen inking or digital inking, as shown in FIG. 1.

At present, all the print technologies for digital inking are designed for inking flat patterns But progressive lenses have a curved surface Different base curve, the lens height difference between the edge and the middle may be about 10 mm spray ink point from print head of print head has been diverged at that distance, and the long travel of the spray ink point is also easily disturbed by the airflow in the environment. Inking quality is always not good for such big different in lens height between middle and edge. Chinese patent 201310172713.1 discloses a digital lens inking printer, although the digital pattern inking of the lens surface is now available, but the above mentioned problems cannot be solved.

Due to the spray point is not inked along the normal direction of the surface, there is a problem of projection ejection. For high base curve lens with smaller the radius, the more convex the surface, which will lower the actual resolution of the inked pattern. The larger the base curve, the rate of decline is more severe. The same resolution of 400 DPI may work well on lenses with smaller base curve, but at high base curve lens, the effect may not be very satisfactory. In order to improve this situation, new technologies and innovations are needed.

As shown in FIG. 1, in general the inking image is often wide in the left-right direction, and narrow in the upper-lower directions. In the left-right direction, the difference between the print head and the lens is relatively large, and the inking effect is often worse than the up-down direction. Of course best way is to utilize single print head with a point-by-point 3-dimensional surface scan, but this speed is too slow not to meet the actual production needs.

In addition, digital inking generally has some cycles of lens loading and uploading, adjustment distance between the lens and print head, and invisible marking recognition, digital inking, ink curing and so on. If there is technology to allow the above processes to be carried out in parallel, it will greatly improve inking, efficiency.

SUMMARY OF THE INVENTION

The object of the present invention is to solve the above problems and provide drum-type lens digital inking device with good inking quality and high inking efficiency.

The invention is achieved by the following technical, solutions. The invention is a drum-type lens digital inking device, which comprises a rotating drum unit, a lens height adjustment unit, an invisible mark recognition unit and an inking unit. The rotating unit includes a rotating drum (7), and at least one lens holding mechanism is disposed on a circumferential surface of the rotation drum. The lens holding mechanism comprises a damper telescopic shaft (10), and the damper telescopic shaft (10) is provided with a vacuum suction used to hold the lens (8). A lens uploading-unloading, workstation, a lens height adjustment workstation, an invisible mark recognition workstation and an inking unit which is arranged on the periphery of the drum. Meanwhile, the workstation is circumferentially distributed around the drum. The lens height adjusting unit is disposed at a lens height adjusting workstation, and the lens height adjusting workstation includes a lens pull-out workstation and a lens pushing-down workstation, the lens pull-out workstation is provided with an outer pull drive mechanism, and an outer pull connector, pushing-down workstation is provided with a push plate drive mechanism and a push-down plate. The driving mechanism is driven by pneumatic, electric or magnetic force.

The invisible mark recognition unit is set at the invisible mark recognition workstation, including an illumination plate and a camera. The illumination plate and the camera are set on both sides of the lens. This means that the lens is located between the illumination plate and the camera. The camera connected to computer. Meanwhile, the camera gets the invisible mark information and transmits it to the computer.

The inking unit installed in the inking workstation, including print head and a print head controller. The print head controller is controlled by computer. The print head is connected to a print head controller, and the print head is disposed above the lens. The computer transmits the reference point XV coordinates and rotation angle information of the image to be printed to the print head controller when the computer has interpreted the invisible mark information.

As an optimization, the inking device is provided with an ink curing unit. The ink curing workstation is set after the inking workstation. The ink curing unit is set at the ink curing workstation, and the ink curing unit use UV ultraviolet light source to irradiate the inked lens.

As an optimization, the driving mechanism of the lens height adjusting unit adopts pneumatics cylinder, and the pull-out driving mechanism is by the pull-out cylinder, and the pushing-down driving mechanism is by a pushing-down cylinder.

As an optimization, when the lens is in the inking workstation, the minimum distance between the lens and the print head is greater than 0 and less than 1 mm.

As an optimization, when the lens is in the outer pull-out position of the lens, the degree of lens pull is more than 1 mm from the highest point of the lens vertex to the center of rotation than the distance from the print head to the center of rotation.

As an optimization, the inking workstation is set at 12 o'clock position.

As an optimization, the radius of the circumference distribution is selected same as the radius of the curvature of the front curve of the lens.

As an optimization, the lens loading-unloading workstation is set at the 3 o'clock position and the lens pull-out station is set at the 5 o'clock position. The push-down lens workstation is set at the 7 o'clock position, and the invisible mark recognition workstation is set at the 9 o'clock position, the ink curing workstation is set at the 1 o'clock position.

As an, optimization, the lens height adjustment workstation and the invisible mark recognition workstation are order interchanged.

As an optimization, the inking device is provided with at least two lens holding mechanisms, and two lens height adjustments units, two invisible mark recognition units and two inking units are arranged side by side on the circumferential surface of the same drum.

The beneficial effects of the present invention are as follows. The inking quality of the invention is good, and the inking quality is better than that of the conventional inking machine. The invention is set with a drum, and the lens is mounted on the drum, with the drum rotation. Using the rotating circumference of the drum, to completely or partially compensate the curvature of the base curve of lens. When the radius of the front curve of the lens is just the same as the radius of the rotating circumference, it is 100% compensation. When there is a difference between the radius of the base curve of lens and the radius of the rotating circumference, it is partially compensated. Those two cases result in the print head drops to the lens center and to the edge reduced what compared to existing technologies, it is improves the quality of the inking.

When inking lens according to the invention, the lens does not easily touch the print head. The invention is provided with a lens height adjustment unit Because different lenses have different vertex heights. If no adjustment is made, the lens is easy to touch the print head at the inking workstation. To control the distance between the highest point of the lens and the print head with a lens height adjustment unit within 1 mm. Meanwhile, the closer the lens is to the print head, the better the inking effect.

The various steps of the digital inking of the present invention can be carried out in parallel to improve efficiency. For digital inking general several steps, such as lens loading-unloading, invisible marking recognition, digital inking, ink curing has been arranged different station design, each station arranged around the drum circumference, easy to achieve automation. When multiple lens holding mechanisms are provided on the drum, the lenses are stored in different workstation, it means that different cycle can be performed at the same time, which greatly improves the efficiency.

The invention can double the inking efficiency and greatly increase the capacity. The invention adopts the design of the left and right double print head station, this is two identical station units are set on the circumference of the drum. It means double the efficiency, and even can be arranged side by side with multiple print heads, can improve efficiency very well. If twin print heads design with left and right layout is used, the capacity of the digital print mirror can be increased to about 600 per hour, while the ordinary inking machine, as described in the Chinese patent 201310172713.1, is only about 120 pair per hour in efficiency, thus increasing capacity by 5 times.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Embodiment 1

Figure 3:
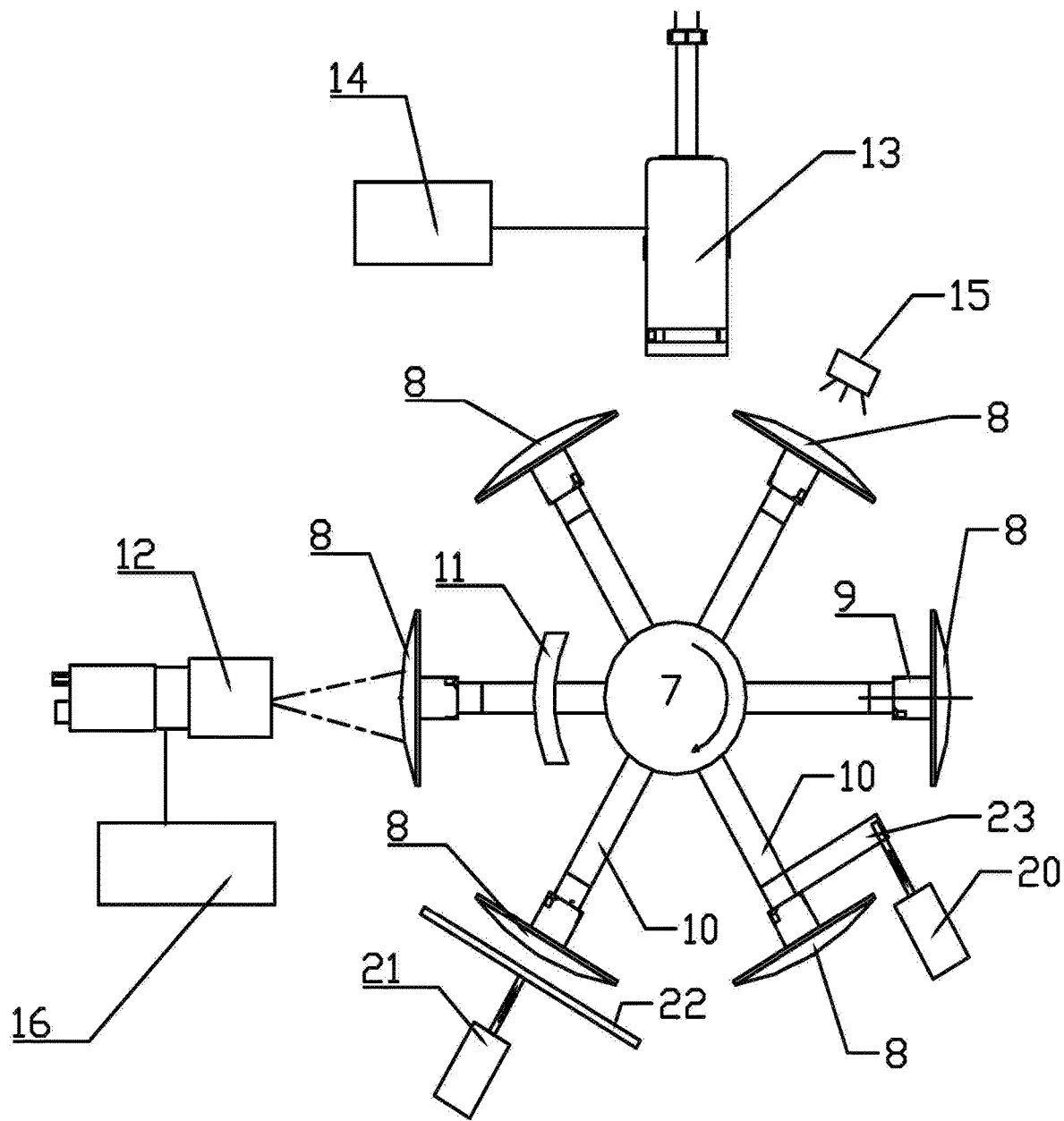
FIG. 3 shows the frame diagram of the digital inking device of the drum-type lens of the invention.

The embodiment is a single print head drum lens digital inking device, as shown in FIG. 3. This embodiment is a drum-type lens digital Inking device. Inking device includes rotating unit, lens height adjustment unit, invisible mark recognition unit, inking unit and ink curing unit.

Figure 1:
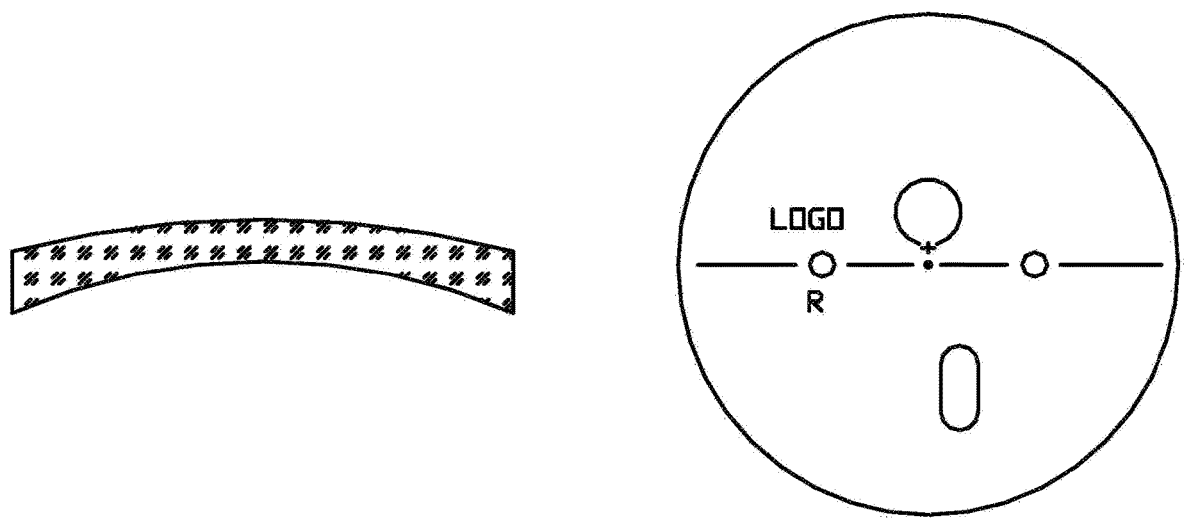
FIG. 1 shows typical progressive multifocal lenses and printed patterns.
Figure 2:
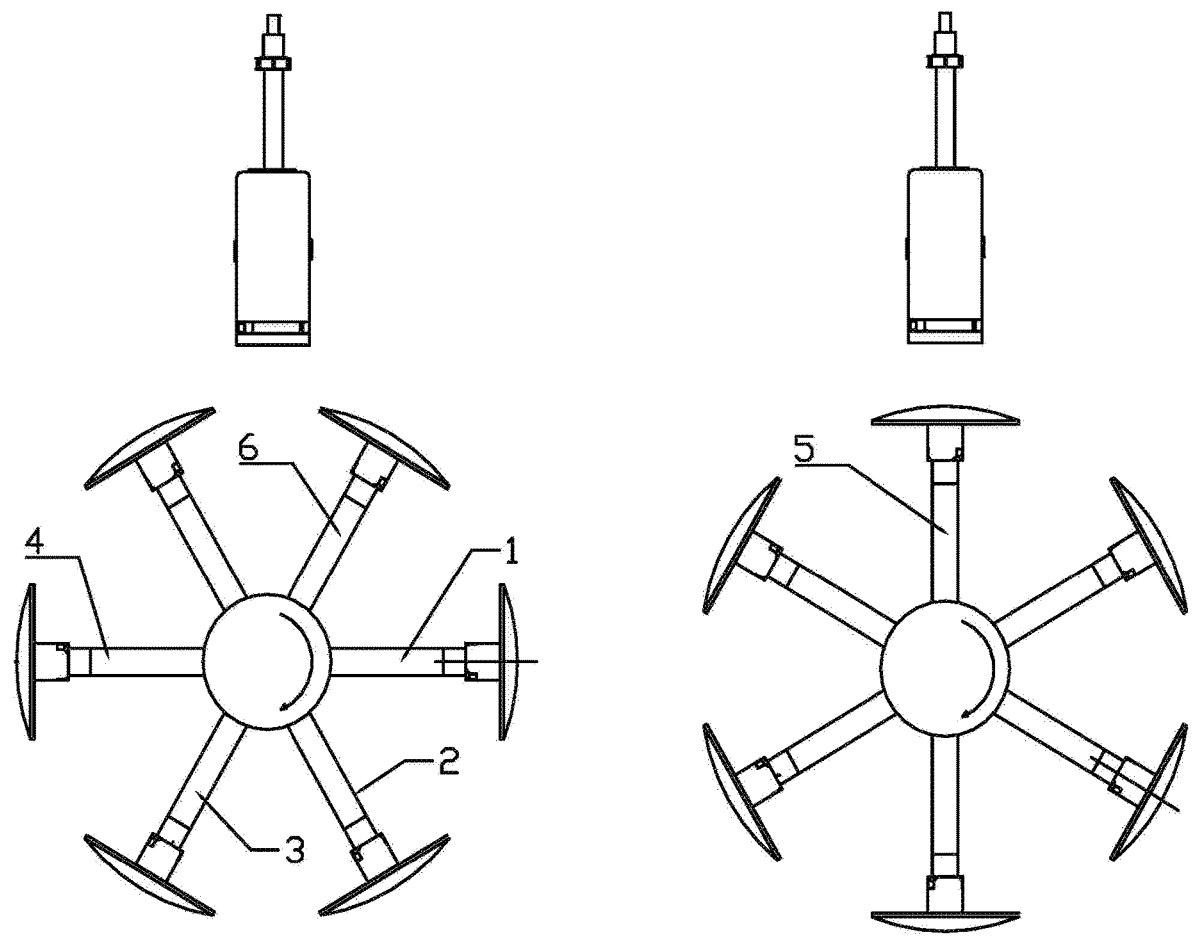
FIG. 2 shows a drum-type layout of each stations of the invention.

As shown in FIG. 2, the rotating unit includes a rotating drum 7 and a motor. The circumference of the drum 7 is evenly arranged with six lens holding mechanism, each lens holding mechanism includes a damping telescopic shaft 10, each damping telescopic shaft 10 is equipped with a vacuum suction for holding lens 8, and the vacuum suction head is connected to the vacuum generator 17.

The periphery of the drum 7 is provided with a lens loading-unloading workstation 1, a lens height adjustment workstation, an invisible mark recognition workstation 4, Inking station 5 and ink curing station 6 around the drum 7 is a circumference distribution. The principle is to use the rotation circumference of the same drum 7 co-axial to complete or partially compensate the curvature of the lens 8 front base curve, so that distance different between from the print head 13 to the lens 8 center and to the edge is reduced, thus improving the quality of the inking. In this embodiment, in order to fully compensation, the radius of the circumference distribution is the same as the curvature of the lens 8 front base curve.

For example, the radius of the front base curve of the lens 8 is 160 mm, and then a circumferential layout having a diameter of 320 mm is preferred. As the radius of the base curve of each lens 8 varies, so does the radius of the circumference distribution. If there is a difference between the curve radius of the lens 8 and the radius of the rotating circumference, compared with the existing technology can also provide compensation, also can improve the quality of inking.

The order of the lens height adjustment unit and the invisible mark recognition unit can be interchanged but need to set before the inking unit. The embodiment selects the lens height adjustment station before the invisible mark recognition station 4. The lens height adjustment station includes the lens pull-out work station 2 and the Push-down lens workstation 3.

Lens loading-unloading station 1 is set at 3 o'clock position, pull-out work station 2 is set at 5 o'clock position, push-down lens workstation 3 is set at 7 o'clock position, invisible mark recognition workstation 4 is set at 9 o'clock position, inking workstation 5 is set at 12 o'clock position, the ink curing workstation 6 is set at 1 o'clock position. Inking workstation 5 must be set at 12 o'clock position, other workstations can also be set in a different direction. Drum 7 can be rotated under the drive of the motor, so that lens 8 can be rotated in turn through the above-mentioned stations.

Different lenses 8 have different vertex heights, in order to avoid lens 8 in the inking station 5 inking, do not touch the print head 13, and the distance between lens 8 in the inking station 5 and the print head 13 as close as possible. The inking device is set with lens height adjustment single element which sets in the lens pull-out workstation 2 and Push-down lens workstation 3, using the pull-out workstation 2 and Push-down lens workstation 3 switch to achieve, lens 8 height up and down adjustment can be used pneumatic, electric and magnetic drive.

This embodiment is priority selects pneumatic mode, lens pull-out workstation 2 is set with the pull-out cylinder (20) and the pull-out connection (23), it makes the lens 8 to pull out, so that the distance from vertex of the lens 8 to the center of rotation of drum is 1 mm greater than the distance of the print head 13 to the center of rotation. In this embodiment pull to the vertex of the lens 8 to the rotation center distance of 6 mm position. The safe distance of 6 mm is recommend, whatever more and less than 6 mm is fine, but the distance between the vertex of the lens 8 and the rotation center must be 1 mm more than the distance between the print head 13 and the rotation. Push-down lens workstation 3 is set with push-down cylinder 21 and push-down plate 22. With push-down plate 22 make lens 8 push back to the sustained height position of the vertex of lens 8, so that the minimum gap between print head 13 and vertex of lens is greater than 0 and less than 1 mm when the lens 8 in the inking station 5.

The invisible mark recognition unit is disposed at the invisible mark recognition workstation 4, including the mask illumination plate 11 and the camera 12. The illumination plate 11 is provided with a pattern with a bright and dark phase, such as the bright and dark phase diagram described in Chinese Patent 201310172713.1. The illumination plate 11 and the camera 12 are disposed on the two sides of the lens 8, that is, the lens 8 is located between the camera 12 and the illumination plate. The computer 16 is connected and the camera 12 that gets the invisible logo information and transmits it to the computer 16.

The inking unit is disposed at the inking workstation 5, including the print head 13 and the print head controller 14, the print head 13 and the print head controller 14 connected, the print head controller 14 is in communication with the computer 16, and the print head 13 is disposed above the lens 8. After the computer 16 gets reference point XY coordinates and rotation angle information of the invisible mark, it transmits control information the print head controller 14. Drum 7 in the drive of motor, rotates at a constant speed to allow the lens 8 to rotate move under the head 13 to complete the inking of the pattern. When the lens 8 is at the inking workstation 5, the distance between the vertex of lens 8 and the print head 13 is greater than 0 and less than 1 mm and is adjusted by the lens height adjusting unit.

The ink curing unit can be set depending on the ink. If the system uses UV ink, it needs the ink curing unit. The inked lens 8 is irradiated with a UV ultraviolet light source 15 to cure the pattern on the lens 8. If the system adopts using a wax-based ink, the ink curing unit can be omitted and not set. In this embodiment, in order to better reflect the ink curing unit, set the ink curing unit.

Embodiment 2

Figure 4:
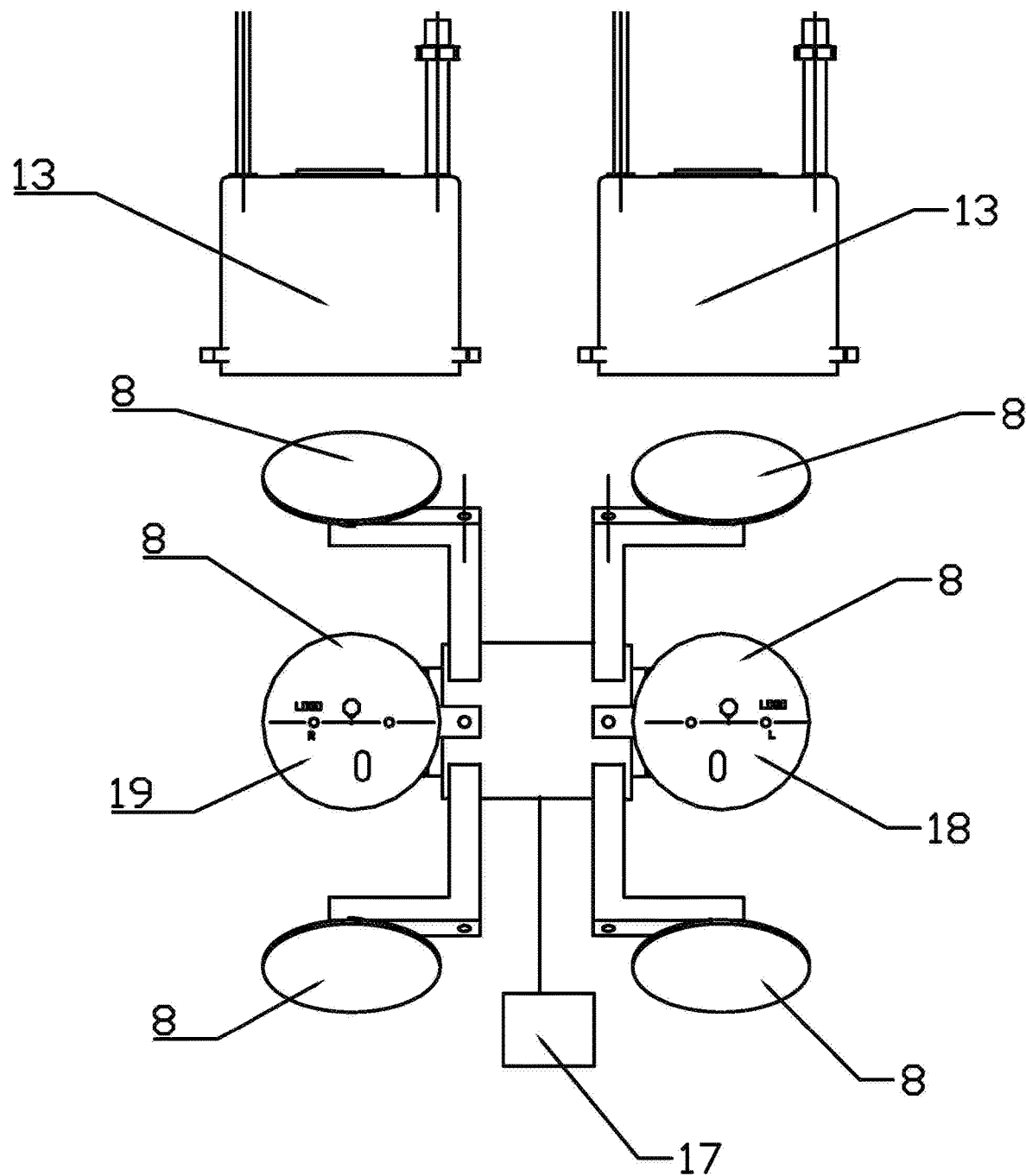
FIG. 4 shows a diagram of the layout of twin print head stations of the invention.

This embodiment is a dual-print head drum-type lens digital inking device, as shown in FIG. 4. This embodiment is compared to the first embodiment, and its difference is that it the dual-print head left and right workstation design, the two rotary lens digital inking devices are combined on one drum 7. The embodiment is a drum-type lens digital inking device, characterized in that the inking device comprises a rotating drum unit, a lens height adjustment unit, invisible mark recognition unit, inking unit and ink curing unit.

As shown in FIG. 2, the rotating drum unit includes a rotating drum 7 and a motor, and six lens holding mechanism uniformly disposed on the rotation circumferential of drum. Each lens holding mechanism includes a damper telescopic shaft 10, and each damper telescopic shaft 10 is provide a vacuum suction to hold the lens 8, and the vacuum suction is connected to the vacuum generator 17.

The periphery of the drum 7 is provided with a lens loading-unloading workstation 1, a lens height adjustment workstation, and an invisible mark recognition workstation 4. The inking, workstation 5 and the ink curing workstation 6 are circumferentially distributed around the drum 7, and the principle is to use the rotation circumference of the coaxial, to complete or partial compensation of the curvature of the front base curve of the lens 8, so that the drop between the print head 13 to vertex of lens and the edge of the lens 8, finally to have high print quality. In this embodiment, in order to fully compensate, the radius of the circumferential distribution is same as the curvature of the lens base curve. For example, the radius of the front base curve of the lens 8 is 160 mm, and then a circumferential layout having a diameter of 320 mm is preferred. As the radius of the base curve of each lens 8 varies, so does the radius of the circumference distribution. If there is a difference between the curve radius of the lens 8 and the radius of the rotating circumference, compared with the existing technology can also provide compensation, it also can improve the quality of inking.

The order of the lens height adjustment unit and the invisible mark recognition unit can be interchanged but need to be placed before the inking unit. In this embodiment, the lens height adjustment unit is selected first, and the invisible mark recognition workstation 4 is behind. Among them, the lens height adjustment unit includes the lens pull-out workstation 2 and the press lens workstation 3.

The lens loading-unloading workstation 1 is set at 3 o'clock position, and the lens pull-out workstation 2 is set at 5 o'clock position. The lens push-down workstation 3 is set at 7 o'clock position, the invisible mark recognition workstation 4 is set at 9 o'clock position, and the inking workstation 5 is placed at 12 o'clock position, the ink curing workstation 6 is set at 1 o'clock position Inking workstation 5 must be set to clock 12 position. Other workstations can also be set in other directions. When the drum 7 is driven by the motor, it can be rotated, so that the lens 8 can be rotated sequentially through each of the above workstations.

Different lenses 8 have different vertex heights. In order to avoid lens 8, do not touch the print head 13 in the inking station 5, the distance between lens 8 in the inking station 5 and the print head 13 as close as possible. The inking device is set with lens height adjustment single element which sets in the lens pull-out workstation 2 and Push-down lens workstation 3, using the pull-out workstation 2 and Push-down lens workstation 3 switch to achieve, lens 8 height up and down adjustment can be used pneumatic, electric and magnetic drive.

This embodiment is priority selects pneumatic mode, lens pull-out workstation 2 is set with the pull-out cylinder 20 and the pull-out connection 23, it makes the lens 8 to pull out, so that the distance from vertex of the lens 8 to the center of rotation of drum is 1 mm greater than the distance of the print head 13 to the center of rotation. In this embodiment pull to the vertex of the lens 8 to the rotation center distance of 6 mm position. The safe distance of 6 mm is recommend, whatever more and less than 6 mm is fine, but the distance between the vertex of the lens 8 and the rotation center must be 1 mm more than the distance between the print head 13 and the rotation. Push-down lens workstation 3 is set with push-down cylinder 21 and push-down plate 22. With push-down plate 22 make lens 8 push back to the sustained height position of the vertex of lens (8), so that the minimum gap between print head 13 and vertex of lens is greater than 0 and less than 1 mm when the lens 8 in the inking station 5.

The invisible mark recognition unit is disposed at the invisible mark recognition workstation 4, including the mask illumination plate 11 and the camera 12. The illumination plate 11 is provided with a pattern with a bright and dark phase, such as the bright and dark phase diagram described in Chinese Patent 201310172713.1. The illumination plate 11 and the camera 12 are disposed on the two sides of the lens 8, that is, the lens 8 is located between the camera 12 and the illumination plate. The computer 16 is connected and the camera 12 that gets the invisible logo information and transmits it to the computer 16.

The inking unit is disposed at the inking workstation 5, including the print head 13 and the print head controller 14, the print head 13 and the print head controller 14 connected, the print head controller 14 is in communication with the computer 16, and the print head 13 is disposed above the lens 8. After the computer 16 gets reference point XY coordinates and rotation angle information of the invisible mark, it transmits control information the print head controller 14. Drum 7 in the drive of motor, rotates at a constant speed to allow the lens 8 to rotate move under the head 13 to complete the inking of the pattern. When the lens 8 is at the inking workstation 5, the distance between the vertex of lens 8 and the print head 13 is greater than 0 and less than 1 mm and is adjusted by the lens height adjusting unit.

The ink curing unit can be set depending on the ink. If the system uses UV ink, it needs the ink curing unit. The inked lens 8 is irradiated with a UV ultraviolet light source 15 to cure the pattern on the lens 8. If the system adopts using a wax-based ink, the ink curing unit can be omitted and not set. In this embodiment, in order to better reflect the ink curing unit, set the ink curing unit.

The inking device is provided with twelve lens holding mechanisms, two lens height adjustment units, and two invisible mark recognition units, the two inking units and the two ink curing units are arranged side by side on the circumferential surface of the same drum 7. On the circumference of the same drum 7, there are units are placed on the left and right sides of the drum 7 equivalently, i.e. on the circumference of the drum 7, there are same layout. Each side has six lens holding mechanisms, one lens height adjustment unit, one invisible mark recognition unit, one inking unit and the one ink curing unit. As shown in FIG. 4, this can double the efficiency.

Since the left and right print heads 13 and the workstation unit do not affect each other, the embodiment also applies to more than two print heads 13 arranged side by side, the design of multiple lenses 8 simultaneously inking, only need to extend the width of the drum 7, can be implemented by one of ordinary skill in the art.

Through the above description of the embodiments, those skilled in the art can understand clearly that the present application may be implemented by means of software plus necessary hardware platforms, or of course, may also be implemented all by software or hardware. Based on such understanding, the entirety or a portion that the technical solutions of the present application contribute over the background art may be embodied in the form of a software product. The computer software product may be stored in storage medium, such as ROM/RAM, disk, optical disk, etc., and comprise several instructions for enabling one computer apparatus (which may be a personal computer, a server, or a network equipment, etc.) to execute the methods described in the respective embodiments or described in certain parts of the embodiments of the present application.

The flowchart and block diagrams in the Figures illustrate the architecture, functionality, and operation of possible implementations of systems, methods and computer program products according to various embodiments of the present application. In this regard, each block in the flowchart or block diagrams may represent a module, segment, or portion of code, which includes one or more executable instructions for implementing the specified logical function(s) It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved Instructions The operator first takes the lens 8, pick up and put lens 8 on the lens suction of lens holding in loading-unloading workstation 1 with the participation of the vacuum generator 17, the lens 8 suction connected to the vacuum pump, then drum 7 is rotated by 60 degrees, and turned to the 5 o'clock position, and the lens 8 reaches the pull-out workstation. The pull-out cylinder 20 and the pull-out connector 23 act on the damper telescopic shaft 10, and pull lens 8 out to the setting position, and the damper shaft 10 is held under the action of the damping force, and the magnitude of the damping force is adjusted by the mechanical structure.

Then the drum 7 continues to rotate 60 degrees, the lens 8 reaches the push-down lens workstation 3. The lens 8 is pushed back by push-down lens cylinder 21, to the uniform height position of the vertex of the lens 8. The rule to select this position is, to ensures that the lens 8 will not blocked by the print head 13 during later inking workstation, and gap between vertex of lens 8 will not be more than 1 mm at the inking workstation 5.

Then, the drum 7 continues to rotate 60 degrees, and the lens 8 is turned to the 9 o'clock position to reach the invisible mark recognition workstation. Inking device's computer finish lens invisible mark recognition at this workstation. The computer 16 then transmits the reference point XY coordinates and rotation angle information of the pattern to be inked to the print head controller 14.

The drum 7 continues to rotate, and the lens 8 is rotated at a constant speed through the inking workstation 5, the lens 8 is inked by printer head 13 controlled by print head controller 14.

The drum 7 continues to rotate, turns the lens 8 to the ink curing workstation 6. Ink curing workstation 6 is based on the type of ink. When the print head 13 adopts UV curing ink, the ink curing workstation 6 is set to use the UV ultraviolet light source 15 to cure inked image on the lens 8. After the curing is completed, the drum 7 continues to rotate, and the lens 8 returns to the lens loading-unloading workstation 1, and the entire sequence ends. With the wax-based ink, the ink curing unit is omitted, and the drum 7 continues to rotate directly back to the lens loading-unloading workstation 1.

During the whole use process, the inking workstation 5 is operated at a constant speed, and other workstations are working in a stopped state. The drum 7 has been intermittently rotated at a constant speed throughout the use.

The same method is used for the digital inking device of the drum-type lens with double print heads, as shown in FIG. 4, the left lens 8 is a digital inking L pattern 18, and the right lens 8 is a digital inking R pattern 19.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A drum-type lens digital inking device, characterized in that the inking device comprises a rotating drum unit, a lens height adjustment unit, invisible mark recognition unit and inking unit;
   wherein the rotating unit includes a rotating drum (7), and at least one lens holding mechanism is disposed on a circumferential surface of the rotation drum, wherein the lens holding mechanism comprises a damper telescopic shaft (10), and the damper telescopic shaft (10) is provided with a vacuum suction used to hold the lens (8);
   wherein the periphery of the rotating drum (7) is provided with a lens loading-unloading, workstation (1), a lens height adjusting workstation, an invisible mark identifying workstation (4), the inking workstation (5) circumferentially distributed around the drum (7);
   wherein the lens height adjustment unit is disposed at a lens height adjustment workstation, and the lens height adjustment workstation includes a lens pull-out workstation (2) and pushing-down lens workstation (3), the lens pull-out workstation (2) is provided with an outer pull drive mechanism and an outer pull connector 23);
   wherein the pushing-down lens workstation (3) is provided with a pushing plate (22) driving mechanism and a pushing plate (22), and the driving mechanism is by pneumatical, motor or magnet;
   wherein the invisible mark recognition unit is disposed at the invisible mark recognition workstation (4), including an illumination plate (11) and a camera (12); the illumination plate (11) and the camera (12) are respectively disposed on two sides of the lens (8), and the camera (12) is connected to the computer (16); and
   wherein the inking unit is disposed at inking workstation (5), including a print head (13) and a print head controller (14), the print head controller (14) communicating with a computer (16), the print head (13) is linked to print head controller (14), and the print head (13) is disposed in the lens (8) above.

2. The drum-type lens digital inking device according to claim 1, wherein the inking device is provided with an ink curing unit, the inking workstation (5) is followed by an ink curing workstation (6), and the ink curing, unit is disposed at Ink curing workstation (6), the ink curing unit irradiates the inked lens (8) with a UV ultraviolet light source (15).

3. The drum-type lens digital inking device according to claim 2, wherein the lens height adjustment unit, driving mechanism is by pneumatical, motor or magnet; the outer pulling drive mechanism is an outer pulling cylinder (20), and the pressing plate driving me Cylinder (21).

4. The rotary lens type digital inking device according to claim 3, wherein when the lens (8) is in the inking workstation (5), the minimum distance between the lens (8) and the print head (13) is greater than 0 and less than 1 mm.

5. The drum-type lens digital inking device according to claim 4, wherein when the lens (8) is at pull-out workstation (2), the lens (8) is pulled out to a degree that the distance from the highest point of the lens (8) to the center of rotation is greater than the distance from print head to the center of rotation is 1 mm or more.

6. The drum-type lens digital inking device according to claim 5, wherein the printer head (5) is set at the 12 o'clock position.

7. The drum-type lens digital inking device according to claim 5, wherein the lens loading-unloading workstation (1) is set at the 3 o'clock position, and the lens pull-out lens workstation (2) is set at the 5 o'clock position, the pushing-down lens workstation (3) is set at the 7 o'clock position, and the invisible mark recognition workstation (4) is set at the at 9 o'clock, the ink curing workstation (6) is set at the clock 1 o'clock position.

8. The drum-type lens digital inking device according to claim 5, wherein said the inking device is provided with at least two lens holding mechanisms, two lens height adjusting units, and two invisible mark recognition units, two inking units, are arranged side by side on the circumferential surface of the same drum (7).

9. The drum-type lens digital inking device according to claim 4, wherein the printer head (5) is set at the 12 o'clock position.

10. The drum-type lens digital inking device according to claim 4, wherein the lens loading-unloading workstation (1) is set at the 3 o'clock position, and the lens pull-out lens workstation (2) is set at the 5 o'clock position, the pushing-down lens workstation (3) is set at the 7 o'clock position, and the invisible mark recognition workstation (4) is set at the at 9 o'clock, the ink curing workstation (6) is set at the clock 1 o'clock position.

11. The drum-type lens digital inking device according to claim 3, wherein the lens loading-unloading workstation (1) is set at the 3 o'clock position, and the lens pull-out lens workstation (2) is set at the 5 o'clock position, the pushing-down lens workstation (3) is set at the 7 o'clock position, and the invisible mark recognition workstation (4) is set at the at 9 o'clock, the ink curing workstation (6) is set at the clock 1 o'clock position.

12. The drum-type lens digital inking device according to claim 3, wherein the printer head (5) is set at the 12 o'clock position.

13. The drum-type lens digital inking device according to claim 12, wherein the lens loading-unloading workstation (1) is set at the 3 o'clock position, and the lens pull-out lens workstation (2) is set at the 5 o'clock position, the pushing-down lens workstation (3) is set at the 7 o'clock position, and the invisible mark recognition workstation (4) is set at the at 9 o'clock, the ink curing workstation (6) is set at the clock 1 o'clock position.

14. The drum-type lens digital inking device according to claim 13, wherein the lens height adjustment workstation and invisible mark recognition workstation (4) are interchanged in order.

15. The drum-type lens digital inking device according to claim 14, wherein said the inking device is provided with at least two lens holding mechanisms, two lens height adjusting units, and two invisible mark recognition units, two inking units, are arranged side by side on the circumferential surface of the same drum (7).

16. The drum-type lens digital inking device according to claim 2, wherein the lens loading-unloading workstation (1) is set at the 3 o'clock position, and the lens pull-out lens workstation (2) is set at the 5 o'clock position, the pushing-down lens workstation (3) is set at the 7 o'clock position, and the invisible mark recognition workstation (4) is set at the at 9 o'clock, the ink curing workstation (6) is, set at the clock 1 o'clock position.

17. The drum-type lens digital inking device according to claim 2, wherein the printer head (5) is set at the 12 o'clock position.

18. The rotary lens digital inking device according to claim 17, wherein the radius of the circumferential same as the radius of curvature of the front base curve of the lens (8).

19. The drum-type lens digital inking device according to claim 18, wherein said the inking device is provided with at least two lens holding mechanisms, two lens height adjusting units, and two invisible mark recognition units, two inking units, are arranged side by side on the circumferential surface of the same drum (7).

20. The drum-type lens digital inking device according to claim 1, wherein said the inking device is provided with at least two lens holding mechanisms, two lens height adjusting units, and two invisible mark recognition units, two inking units, are arranged side by side on the circumferential surface of the same drum (7).

* * * * *